Patented Jan. 31, 1933

1,895,724

UNITED STATES PATENT OFFICE

ERNEST B. MILLER AND GERALD C. CONNOLLY, OF BALTIMORE, MARYLAND, ASSIGNORS TO THE SILICA GEL CORPORATION, OF BALTIMORE, MARYLAND, A CORPORATION OF MARYLAND

PROCESS OF REMOVING SULPHUR COMPOUNDS FROM GAS MIXTURES

No Drawing.   Application filed October 26, 1927.   Serial No. 228,987.

This application is a continuation in part of our application Serial No. 149,521, filed November 19, 1926.

The present invention relates to a process of removing sulphur compounds from gas mixtures and more particularly to the removal of hydrogen sulphide from gases containing the same by oxidation of the sulphide in the presence of a suitable catalyst hereinafter described.

It has been proposed to oxidize hydrogen sulphide according to the reaction

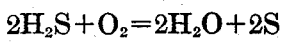

$$2H_2S + O_2 = 2H_2O + 2S$$

by the use of highly porous silicic acid as a catalyst. The efficiency or activity of the silicic acid for this purpose is very low.

According to the present invention, it has been found that properly prepared silica gel impregnated with, or containing, a suitable material such as a metallic oxide will convert a sulphur compound such as hydrogen sulphide, when mixed with an oxidant gas, into sulphur with a high efficiency and at temperatures much lower than required for the use of plain porous silicic acid, that is, silicic acid that is unmodified by the addition of an oxide.

The present process is particularly applicable to the removal of the hydrogen sulphide contained in such gases as coke oven gas, water or generator gas, or mixtures of these gases, in artificial illuminating or ordinary city gas, natural gas, casing-head gas, and to other gases; and in almost all gases, alone or in admixture, which contain hydrogen sulphide. With proper operating conditions, all of the hydrogen sulphide has been removed from gases containing the same by means of the catalyst described herein.

Although various metallic oxides such as the oxides of iron, copper, manganese, nickel, etc. may be employed in the process with good results, it has been found that hydrogen sulphide is more readily and efficiently oxidized when contacted in admixture with air or other oxidizing agent, with silica gel impregnated with about 2.5% ferric oxide ($Fe_2O_3$). It is to be distinctly understood, however, that the invention is by no means limited to the use of ferric oxide or to the specific proportions mentioned.

According to one method of preparing the catalyst, the highly porous silica gel is treated with a salt solution and then heated so that the salt is decomposed to the metal oxide. For example, the highly porous silica gel may be mixed with a solution of ferric nitrate of such strength and quantity that in the final product there will be about 2.5% ferric oxide based on the weight of silica gel (dry). Thereafter, the silica gel is treated to decompose the ferric nitrate into oxide. This may be easily accomplished by merely heating the silica gel. Other methods of preparing the catalyst may be utilized.

The highly porous material employed in the present invention is preferably a gel. The pores are so minute that it is impossible to directly measure their dimensions. However, one rule for determining whether the material has the proper porous structure involves the amount of water vapor that the porous material will absorb at a low partial pressure. Thus, the porous material suitable for the present invention should have pores of such size that the material will adsorb water vapor to such an extent as to contain not less than about 10% of its own weight (when dry) of water when in equilibrium with water vapor at 30° C. and a partial pressure of 22 mm. of mercury. Silica gel is the gel preferred for impregnation and use as above described, but other gels having like pore characteristics may be employed, such as gels of tungsten oxide, titanium oxide, stannic oxide, aluminum oxide, etc. The preferred gels will take up more than the 10% of water mentioned above. Thus, the best silica gels will adsorb water vapor to such an extent as to contain about 41% of their weight (when dry) when in equilibrium with water vapor at 30° C. and a partial pressure of 22 mm. of mercury.

The present process consists essentially in contacting mixtures of oxidant gas, such as air, and such gases as coke oven gas, generator or water gas, or mixtures thereof, with a silica or equivalent gel impregnated with, or having associated therewith, a metallic oxide, and heated at a suitable temperature. As a result of the catlytic effect of the impregnated material, hydrogen sulphide is oxidized to free sulphur, with the evolution of considerable heat. The sulphur separates as a liquid or solid, depending upon the temperature, while any sulphur dioxide formed may be easily removed from the gas by the addition of ammonia, to form ammonium sulphite, it being understood, of course, that sulphur dioxide may react with hydrogen sulphide to form sulphur and water.

Preferably, the catalyst is used in finely pulverized condition and is fed into a stream of the gases to be treated. This may be done so that the catalyst will be carried along in suspension in the stream or so that the catalyst will fall through the stream in a direction opposite to the direction of flow of the stream. A temperature of 185° to 210° C. is maintained. After the catalyst has been in contact with the stream for sufficient time, it is separated therefrom and given an activating treatment and returned so as to be again fed into the stream. The sulphur will go along with the catalyst and be separated therefrom by heat, say in the activator. Thus, the powdered catalyst moves in a closed cycle and is used over and over. The activation may consist in merely heating the catalyst by a stream of air passing over the same at a temperature of 400° to 600° C. Processes employing the pulverized catalyst in these ways are broadly claimed in applications 10,836 and 118,398.

The present invention may also be carried out with the catalyst disposed in the form of a layer or bed. The best results have been obtained with two beds of the catalyst, and the gas and air mixture passed through the beds in series, at a temperature of between 200° and 210° C. for the first bed and a temperature of 185° to 200° C. for the second bed, although good results have been secured at temperatures both below and above those specified.

With silica gel impregnated with about 2.5% $Fe_2O_3$ a 100% removal of sulphur from gases containing hydrogen sulphide has been obtained, and this efficiency of the catalyst continued for a considerable period of time without regenerating. With the use of plain silica gel, that is, silica gel unmodified by the addition of a metallic oxide, in the treatment of coke oven gases, the highest efficiency obtained was about 29% at the beginning of the operation, and this efficiency rapidly decreased with the continued passage of the gas. In a similar treatment of water gas with the plain gel, about 19% of the sulphur content was removed at the beginning of the run, but even this low efficiency decreased very rapidly as the run continued.

By impregnating the gel with a small amount of ferric oxide, for example, not only is the sulphur completely removed from the gas, but also the catalyst remains serviceable over considerable periods of time and permits operation at lower temperatures than when the plain gel is employed. When a gel containing 4.87% $Fe_2O_3$ was employed, the efficiency was very much higher than with the plain gel, but lower than with the 2.5% $Fe_2O_3$ gel mass. This appears to indicate that the $Fe_2O_3$ content was sufficiently high to have clogged some of the pores of the gel, thus reducing the active surface of the latter. This, together with the results obtained with the plain gel, indicates that the high percentage of removed sulphur is due neither to the effect of the $Fe_2O_3$ alone nor to the gel alone, but to the combined action of the oxide and gel.

The catalytic action of the $Fe_2O_3$ gel appears to be more effective the lower the content of heavy hydrocarbons in the gases treated; and it is more effective with coke oven gas than with generator gas, presumably for the reason that the heavy hydrocarbons present in the generator gas carbonize to a slight extent in the gel mass and reduce the active surface thereof. This does not mean, however, that the process is of little value in the purification of generator gas, but quite the contrary, for a 96% removal of sulphur therefrom by oxidation of its hydrogen sulphide content in the presence of iron oxide impregnated gel has been secured.

The process is not limited to a particular rate of flow of gas through the catalytic mass, but it has been found that the preferred rate of flow is in the neighborhood of 50 cc. per gram of gel per minute. This rate gives very satisfactory results. With respect to the introduction of air into the reaction chamber, it has been found that a small excess of air has no noticeable, harmful effect on the reaction; so that, rather than attempt to keep the ratio of air to $H_2S$ constant, it is preferred to keep the volume of air itself constant. As stated above, the catalyst may consist of an adsorbent impregnated with any one or more metallic oxides, but silica gel containing ferric oxide, to the extent of about 2.5%, at the present time gives very satisfactory results.

Reactivation of the catalyst appears to have no injurious effect upon its activity, as equally good efficiencies of the catalyst have been obtained after it has been reactivated many times. The reactivation of the impregnated gel may be performed at 480° to 510° C. with the introduction of a slow stream of air, although the invention is not limited to these temperatures in all cases. The catalyst may be reactivated in many other ways, some of which are:

1. The elementary sulphur may be sublimed from the gel by direct heat and recovered in any well known manner. The catalyst is then to be heated to a temperature of approximately 1000° F. in the presence of air whereby any remaining sulphur either in the elemental condition or in combination with the iron, as sulphide, will be liberated and any sulphide of iron will be reconverted to ferric oxide.

2. The elementary sulphur may be leached from the gel with any suitable solvent therefor; and any solvent remaining in the gel may be recovered therefrom by treatment with steam. The sulphur and solvent which comprise the solution may then be separated from each other, for example by distillation, and the catalyst may be reactivated by treatment with air at about 1000° F. as above.

3. The sulphur may all be oxidized to sulphur dioxide by a regulated amount of air at an elevated temperature, and most of such sulphur dioxide may then be recovered in the liquid form, or it may be fed to a contact mass for conversion into sulphur trioxide, or it may be otherwise disposed of. Here again the catalyst should be treated with an excess of air at about 1000° F.

Silica gel impregnated with 1.3% of $Fe_2O_3$, a like gel containing 1.07% CuO, again a like gel containing 1.3% $Fe_2O_3$ and 0.98% CuO were found to give good results.

Where organic sulphur compounds are to be removed, the process comprises two steps. First the organic sulphur compound, for example carbon bisulphide ($CS_2$) is converted to hydrogen sulphide ($H_2S$), and this is then oxidized to sulphur in the manner described herein. The catalyst employed for both steps may be the same, for example an iron oxide impregnated silica gel. For the conversion of the organic sulphur compounds to hydrogen sulphide no oxidant is to be present, as the reaction is of a reducing nature. Practically all gases of the types mentioned carry more or less hydrogen and hydrogen may even be added, and such addition may become necessary if there is no hydrogen present. Furthermore, a higher temperature than is required for the catalytic oxidation of hydrogen sulphide to sulphur is necessary to convert the organic sulphur compounds catalytically to hydrogen sulphide. Thus to change the $CS_2$ in a gas to $H_2S$, the gas mixture (without oxidant) is contacted with a suitable catalyst such as an iron oxide impregnated gel at a temperature of about 350° to 400° C. Then the mixture with the $H_2S$ is contacted with the same or another batch of the catalyst at a lower temperature, say 185° C. to 210° C. to oxidize the $H_2S$ to S and $H_2O$.

The present process is therefore applicable to the treatment of gases containing sulphur compounds that can be oxidized to S or $SO_2$, as well as organic sulphur compounds convertible into $H_2S$.

The methods followed in the treatment of natural or casing-head gases are substantially the same as the methods already described herein except that where the gas contains enough recoverable hydrocarbons (gasoline) such recoverable hydrocarbons may be first removed from the gases by passing the raw gases through an adsorption unit wherein the adsorbent may be silica gel, and then subjecting the stripped gases to the above described process for removing the hydrogen sulphide. This step of first removing the condensable gasoline is not essential for the removal of the hydrogen sulphide, but it naturally results in a saving of gasoline, and also in prolonging the efficiency of the hydrogen-sulphide-removing catalyst.

Various specified details of procedure and conditions of operation have been set forth above for the purpose of giving a clear understanding of the process, but the invention is not limited to the exact details given, as it includes modifications and changes coming within the scope of the appended claims.

Having thus described the invention, what is claimed as new and desired to be secured by Letters Patent is:

1. The process consisting in contacting a gas containing sulphur compound that can be oxidized to S or $SO_2$ and an oxidant with a catalyst comprising a highly porous gel and metal oxide.

2. The process consisting in contacting a gas containing a sulphur compound that can be oxidized to S or $SO_2$ and an oxidant with a catalyst comprising a highly porous gel and ferric oxide.

3. The process according to claim 1 wherein the adsorbent is silica gel.

4. The process according to claim 2 wherein the adsorbent is silica gel.

5. The process according to claim 1 wherein the metal oxide is 1.3% to 4.87% by weight of the adsorbent.

6. The process according to claim 1 wherein the oxide is 2.5% by weight of the adsorbent.

7. The process according to claim 1 wherein the adsorbent is silica gel and the oxide is 2.5% of the weight of the silica gel.

8. The process consisting in contacting a gas containing a sulphur compound that can be oxidized to S or $SO_2$ and an oxidant with a catalyst comprising a solid adsorbent material having pores of such size that it will adsorb water vapor to such an extent as to contain not less than about 10% of its own weight of water when in equilibrium with water vapor at 30° C. and a partial pressure of 22 mm. of mercury and metallic oxide, the reaction being effected at about 200° C.

9. The process according to claim 8 wherein the oxide is ferric oxide.

10. The process according to claim 8 wherein the material is silica gel.

11. The process according to claim 8 wherein the material is silica gel and the oxide is ferric oxide.

12. The process according to claim 8 wherein the metallic oxide is 2½% by weight of the material.

13. The process consisting in contacting a gas containing hydrogen sulphide and an oxidant with a catalyst comprising a solid porous gel and metal oxide, and introducing ammonia into the oxidized gas to thereby recover the sulphur dioxide as ammonium sulphite.

14. The process according to claim 13 wherein the gel is silica gel.

15. The process according to claim 13 wherein the oxide is ferric oxide.

16. The process consisting in contacting a gas containing a sulphur compound that can be oxidized to S or $SO_2$ and an oxidant successively with two beds of a material comprising a porous adsorbent and metal oxide, the first bed being at a higher temperature than the second whereby said sulphur compound is oxidized.

17. The process according to claim 16 wherein the first bed is at a temperature of 200° to 210° C. and the second bed at a temperature of 185° to 200° C.

18. The process of removing inorganic sulphur compounds from gases consisting in suspending pulverized material comprising a solid adsorbent and metal oxide in a gas containing a sulphur compound that can be oxidized to S or $SO_2$ and an oxidant whereby said sulphur compound is oxidized, separating the material from the gas, activating the material and again using it on more gas.

19. The process consisting in contacting a gas containing hydrogen sulphide and an oxidant with a catalyst comprising a solid adsorbent material having pores of such size that it will absorb water vapor to such an extent as to contain not less than about 10% of its own weight of water when in equilibrium with water vapor at 30° C. and a partial pressure of 22 mm. of mercury, and a catalytically active metallic substance to thereby oxidize the hydrogen sulphide.

20. The process according to claim 1 wherein the catalyst is silica gel carrying about 2½% by weight of ferric oxide.

21. The process according to claim 8 wherein the material is silica gel carrying about 2½% by weight of ferric oxide.

22. The process according to claim 13 wherein the catalyst is silica gel carrying about 2½% by weight of ferric oxide.

23. The process of treating gases comprising inorganic sulphur compounds, which includes contacting the same with a catalyst comprising a solid adsorbent material and a catalytically active metallic substance associated therewith at a temperature of about 350° to 400° C. whereby organic sulphur compounds are converted into hydrogen sulphide.

24. The process of treating gases comprising organic sulphur compounds, which includes contacting the same with a catalyst comprising a solid adsorbent material and metal oxide at a temperature of about 350° to 400° C. whereby organic sulphur compounds are converted into hydrogen sulphide.

25. The process of treating gases comprising organic sulphur compounds, which includes contacting the same with a catalyst comprising a solid adsorbent material and ferric oxide at a temperature of about 350° to 400° C. whereby organic sulphur compounds are converted into hydrogen sulphide.

26. The process of treating gases comprising organic sulphur compounds, which includes contacting the same with a catalyst comprising a highly porous gel and metal oxide at a temperature of about 350° to 400° C.

27. The process of treating gases comprising organic sulphur compounds, which includes contacting the same with a catalyst comprising a highly porous gel and ferric oxide at a temperature of about 350° to 400° C.

28. The process of treating gases comprising organic sulphur compounds, which includes contacting the same with a catalyst comprising silica gel and metal oxide, at a temperature of about 350° to 400° C.

29. The process of treating gases comprising organic sulphur compounds, which includes contacting the same with a catalyst comprising silica gel and ferric oxide at a temperature of about 350° to 400° C.

30. The process of treating gases comprising organic sulphur compounds, which includes contacting the same with a catalyst comprising silica gel and 1.3% to 4.87% by weight of metal oxide at a temperature of about 350° to 400° C.

31. The process of treating gases comprising organic sulphur compounds, which includes contacting the same with a catalyst comprising silica gel and about 2.5% by weight of ferric oxide at a temperature of about 350° to 400° C.

32. The process of treating gases comprising organic sulphur compounds, which includes contacting the same with a catalyst comprising a solid adsorbent material and a catalytically active metallic substance associated therewith at a temperature of about 350° to 400° C., and then contacting the resulting gases mixed with an oxidant with a catalyst comprising a solid adsorbent material and a catalytically active metallic substance associated therewith at a temperature of about 185° to 210° C.

33. The process of treating gases comprising organic sulphur compounds, which includes contacting the same with a catalyst comprising a solid adsorbent material and metal oxide at a temperature of about 350° to 400° C., and then contacting the resulting gases mixed with an oxidant with a catalyst comprising a solid adsorbent material and metal oxide at a temperature of about 185° C. to 210° C.

34. The process of treating gases comprising organic sulphur compounds, which includes contacting the same with a catalyst comprising a solid adsorbent material and ferric oxide at a temperature of about 350° to 400° C., and then contacting the resulting gases mixed with an oxidant with a catalyst comprising a solid adsorbent material and metal oxide at a temperature of about 185° C. to 210° C.

35. The process of treating gases comprising organic sulphur compounds, which includes contacting the same with a catalyst comprising a highly porous gel and metal oxide at a temperature of about 350° to 400° C. and then contacting the resulting gases mixed with an oxidant with a catalyst comprising a highly porous gel and metal oxide at a temperature of about 185° to 210° C.

36. The process of treating gases comprising organic sulphur compounds, which includes contacting the same with a catalyst comprising a highly porous gel and ferric oxide at a temperature of about 350° to 400° C., and then contacting the resulting gases mixed with an oxidant with a catalyst comprising a highly porous gel and metal oxide at a temperature of about 185° to 210° C.

37. The process of treating gases comprising organic sulphur compounds, which includes contacting the same with a catalyst comprising silica gel and metal oxide at a temperature of about 350° to 400° C., and then contacting the resulting gases mixed with an oxidant with a catalyst comprising silica gel and metal oxide at a temperature of about 185° C. to 210° C.

38. The process of treating gases comprising organic sulphur compounds, which includes contacting the same with a catalyst comprising silica gel and ferric oxide at a temperature of about 350° to 400° C., and then contacting the resulting gases mixed with an oxidant with a catalyst promoting the oxidation of hydrogen sulphide at a temperature of about 185° to 210° C.

39. The process of treating gases comprising organic sulphur compounds, which includes contacting the same with a catalyst comprising silica gel and 1.3% to 4.87% by weight of metal oxide at a temperature of about 350° to 400° C., and then contacting the resulting gases mixed with an oxidant with a catalyst comprising silica gel and 1.3% to 4.87% by weight of metal oxide at a temperature of about 185° to 210° C.

40. The process of treating gases comprising organic sulphur compounds, which includes contacting the same with a catalyst comprising silica gel and about 2.5% by weight of ferric oxide at a temperature of about 350° to 400° C., and then contacting the resulting gases mixed with an oxidant with a catalyst comprising silica gel and about 2.5% by weight of metal oxide at a temperature of about 185° to 210° C.

41. The process of removing inorganic sulphur compounds from gases consisting in contacting a gas containing a sulphur compound that can be oxidized to S or $SO_2$ and an oxidant successively with two beds of a material comprising a porous adsorbent and a metallic substance oxidation catalyst associated therewith, the second of said beds being at a higher temperature than the first.

42. The process according to claim 41 wherein the metallic substance contains a metal of the iron group.

43. The process consisting in contacting a gas containing a sulphur compound that can be oxidized to S or $SO_2$ and an oxidant with a catalyst comprising a solid adsorbent material and a metal oxide, said adsorbent material having pores of such size that it will adsorb water vapor to such an extent as to contain not less than about 10% of its own weight of water when in equilibrium with water vapor at 30° C. and a partial pressure of 22 mm. of mercury.

44. The process according to claim 43 wherein the metal oxide is ferric oxide.

45. The process of treating gases comprising organic sulphur compounds and a reducing gas which includes contacting the same with a catalyst comprising a solid adsorbent material having pores of such size that it will adsorb water vapor to such an extent as to contain not less than about 10% of its own weight of water when in equilibrium with water vapor at 30° C. and a partial pressure of 22 mm. of mercury, and a catalytically active metallic substance at a temperature not exceeding 400° C. to convert said organic sulphur compounds into hydrogen sulphide, and then removing the hydrogen sulphide from said gas.

46. The process according to claim 45 wherein the catalytically active metallic substance is a compound of a metal.

47. The process according to claim 45 wherein the catalytically active metallic substance is an oxide of metal.

48. The process according to claim 45 wherein the catalytically active metallic substance is ferric oxide.

In testimony whereof we hereunto affix our signatures.

ERNEST B. MILLER.
GERALD C. CONNOLLY.